(12) United States Patent
Ma et al.

(10) Patent No.: US 6,992,822 B2
(45) Date of Patent: Jan. 31, 2006

(54) PROJECTION DISPLAY SYSTEM USING A DIFFUSE REFLECTING POLARIZER

(75) Inventors: Jiaying Ma, Maplewood, MN (US); David J. W. Aastuen, Shoreview, MN (US); Abolghassem B. Mahmoodi, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/120,371

(22) Filed: May 3, 2005

(65) Prior Publication Data

US 2005/0200955 A1    Sep. 15, 2005

Related U.S. Application Data

(63) Continuation of application No. 10/151,698, filed on May 16, 2002.

(51) Int. Cl.
 *G02B 27/28* (2006.01)
 *G03B 21/56* (2006.01)
(52) U.S. Cl. ............... 359/487; 359/501; 359/443; 359/489; 359/449
(58) Field of Classification Search ............... 359/501, 359/443, 487, 489, 449, 460, 483
See application file for complete search history.

(56) References Cited

U.S. PATENT DOCUMENTS

| 5,825,542 | A | 10/1998 | Cobb et al. |
| 5,825,543 | A | 10/1998 | Ouderkirk et al. |
| 5,828,488 | A * | 10/1998 | Ouderkirk et al. .......... 359/487 |
| 6,031,665 | A | 2/2000 | Carlson et al. |
| 6,124,971 | A | 9/2000 | Ouderkirk et al. |
| 6,239,907 | B1 | 5/2001 | Allen et al. |
| 6,310,671 | B1 | 10/2001 | Larson |
| 6,348,995 | B1 * | 2/2002 | Hansen et al. ............... 359/486 |
| 6,381,068 | B1 * | 4/2002 | Harada et al. ............... 359/443 |
| 6,449,089 | B1 * | 9/2002 | Moshrefzadeh et al. ..... 359/454 |
| 6,515,785 | B1 | 2/2003 | Cobb et al. |
| 6,809,782 | B1 * | 10/2004 | Kawamoto et al. ........... 349/96 |
| 2001/0030804 | A1 | 10/2001 | Lambert |
| 2001/0055153 | A1 | 12/2001 | Moshrefzadeh et al. |
| 2002/0163719 | A1 | 11/2002 | Ma et al. |

FOREIGN PATENT DOCUMENTS

WO    WO 00/57214    9/2000

* cited by examiner

*Primary Examiner*—W. B. Perkey
*Assistant Examiner*—Magda Cruz
(74) *Attorney, Agent, or Firm*—Stephen W. Buckingham (57) ABSTRACT

In one embodiment, a projection screen includes a diffuse reflecting polarizer that diffusively reflects light polarized in a first direction and transmits light polarized in a second direction. The projection screen may also include a second polarizer adjacent a back side of the diffuse reflecting polarizer, wherein the second polarizer is oriented to transmit light polarized in the second direction. The projection screen may appear substantially diffuse when viewed from a front side and substantially transparent when viewed from a back side.

18 Claims, 6 Drawing Sheets

PROJECTION DISPLAY SYSTEM USING A DIFFUSE REFLECTING POLARIZER

This application is a continuation application of U.S. patent application Ser. No. 10/151,698, entitled "PROJECTION DISPLAY SYSTEM," filed May 16, 2002, the entire content of which is incorporated herein by reference.

TECHNICAL FIELD

The invention relates to projection display systems and display screens for LCD projectors.

BACKGROUND

Projection display systems typically include a projector and a projection display screen. The projector may be a three-color liquid crystal display projector that combines polarized light from different liquid crystal displays and emits combined light to form images. The projector can project the images on the display screen for presentation to viewers. The display screen may provide a diffuse surface to improve the image quality seen by viewers.

Projectors capable of emitting polarized light may be most efficient when the directions of polarization vary for the different colored lights that are combined. For instance, light polarized in one direction may be more efficient for reflecting, while light polarized in another direction may be more efficient for transmission. Therefore, the light output from the projector may contain some colored light that is reflected within the projector and is polarized in one direction, and may contain other colored light that only transmits through the projector and is polarized in the other direction.

Projection screens typically include particles held in a transparent medium and a reflective material located behind the particles. Conventional projection screens may reflect substantially all of the incident light, including both the light from the imaging source and the ambient light. The reflection of the ambient light towards the viewers may result in reduced contrast of the image, particularly in areas that receive relatively high levels of ambient light. Such reductions in contrast, however, are generally undesirable.

Improving the projection screen and/or the projector can improve the image quality presented to viewers. Furthermore, improvements to the screen and/or the projector may allow the system to be used in non-conventional settings. For theses and other reasons it is highly desirable to improve projectors and projection screens.

SUMMARY

In general, the invention is directed to projectors, projection screens, and projection systems that include a projector that projects images on a projection screen. As described in greater detail below, light polarization can be manipulated and exploited in order to improve the display of images to viewers. In addition, the techniques and structures described below may allow projection systems to be used in non-conventional settings. In one example, a projection screen is described that allows viewers on the side where the image is projected, i.e the front side, to see improved image quality. In addition, viewers on the other side, i.e. the back side of the screen, may be able to see through the projection screen. In particular, the screen may appear substantially diffuse when viewed from the front side of the screen and substantially transparent and non-diffuse when viewed from the back side of the screen.

In another embodiment, the invention may be directed to a system comprising a multi-color transmissive projector that emits light in which all colors are polarized in a common direction. The system may further include a diffuse projection screen that reflects light of the same polarization as the light emitted from the projector, and transmits light of a different polarization as the light emitted from the projector. The diffuse projection screen may comprise a diffuse reflecting polarizer that diffusively reflects light polarized in a first direction and transmits light polarized in a second direction. The projection screen may also include a second polarizer adjacent a back side of the diffuse reflecting polarizer. Like the diffuse reflective polarizer, the second polarizer may be oriented to transmit light polarized in the second direction. For example, the second polarizer may comprise a reflecting polarizer or an absorbing polarizer. The combination of the diffuse reflective polarizer and the second polarizer may result in a projection screen which appears substantially transparent when viewed from the back side, and substantially diffuse when observed from the front side.

Additional details of various embodiments of the invention are set forth in the accompanying drawings and the description below. Other features, objects, and advantages of the invention will be apparent from the description and drawings, and from the claims.

DETAILED DESCRIPTION

Figure 1:
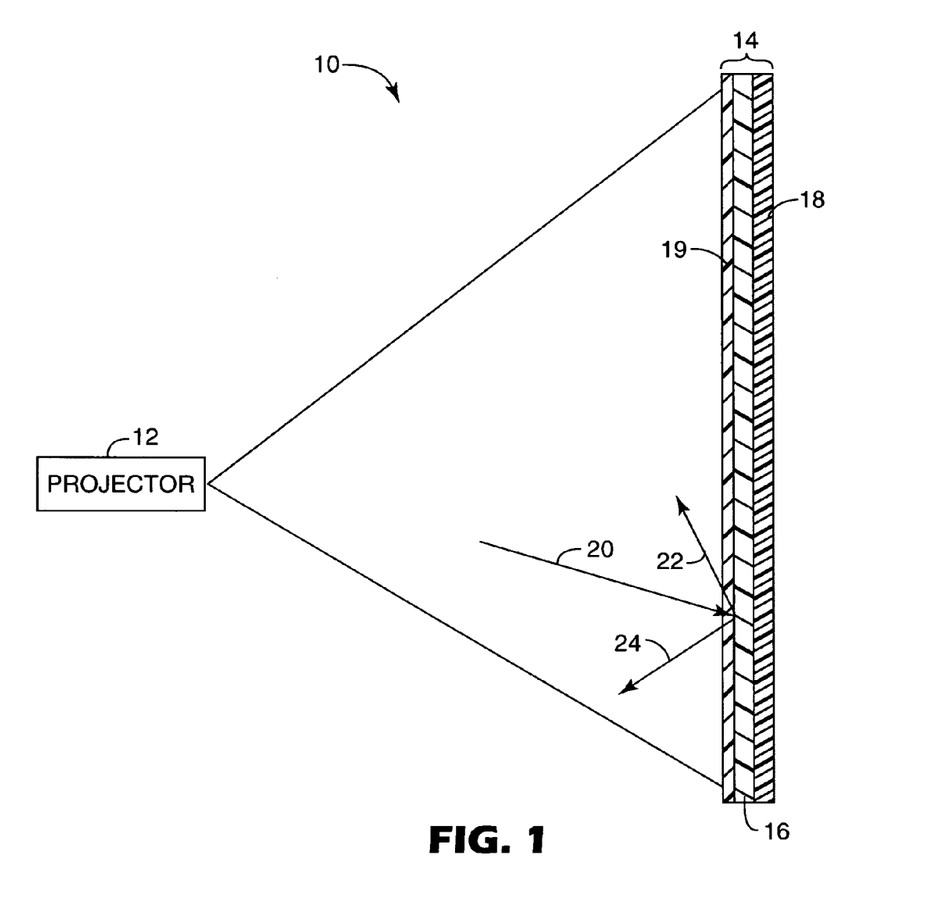
FIG. 1 is a cross-sectional side view illustrating an exemplary projection system in accordance with the principles of the invention.

FIG. 1 is a cross-sectional side view illustrating an exemplary projection system 10 in accordance with the principles of the invention. Projection system 10 comprises a projector 12 and a projection screen 14. Projection screen 14 includes a diffuse reflecting polarizer 16 that diffusely reflects light polarized in a first direction and transmits light polarized in a second direction. The first and second directions of polarization may be perpendicular to one another, although the invention is not necessarily limited in that respect.

Projection screen 14 also includes a second polarizer 18 adjacent the back side of diffuse reflecting polarizer 16. The orientation of polarizer 18 with respect to diffuse reflecting polarizer 16 is such that polarizer 18 transmits light polarized in the second direction. In other words, the diffuse reflecting polarizer 16 and the second polarizer 18 are aligned such that both polarizers transmit light polarized in the second direction. By way of example, polarizer 18 may be a reflecting polarizer or an absorbing polarizer. Alternatively, polarizer 18 may be another diffuse reflecting polarizer.

When polarizer 18 comprises a reflecting polarizer or an absorbing polarizer, advantages can be realized. In those cases, projection screen 14 may appear substantially diffuse when observing from a front side, i.e., the side illuminated by projector 12. At the same time, projection screen 14 may appear substantially transparent when viewed from the back side, i.e., the side not illuminated by projector 12. In other words, the back side corresponds to a light incident side of the second polarizer 18 and the front side corresponds to a light incident side of the diffuse reflecting polarizer 16.

Because projection screen 14 appears substantially diffuse when viewed from the front side and substantially transparent when viewed from the back side, it may be particularly useful in non-traditional settings. For example, projection screen 14 may be used in a window, allowing images to be viewed by people outside, while simultaneously allowing people inside to see outward, through the window. Such applications may find use in a variety of window applications, including for example, commercial business settings and restaurants that display advertisements to persons passing by the storefront. In those cases, customers inside the store may be able to see out through the screen 14, and potential customers outside the store may be lured into the store by the displayed advertisements.

As mentioned, the front side of screen 14 may appear substantially diffuse and the back side of screen 14 may appear substantially transparent. At the same time screen 14 may help reduce the amount of external light, such as sunlight, allowed through screen, much like tinted glass. Thus, when viewed from the back side, screen 14 may appear tinted, blocking some light, but remaining substantially transparent such that objects can be viewed through the screen 14.

Projection screen 14 may further include a glare-suppressing element 19 to suppress glare from the front surface of projection screen 14. Glare from the front surface of projection screen 14 may occur due to the interface between diffuse reflecting polarizer 16 and air. Glare suppressing element 19 may be a coating of an antireflective material that reduces the intensity of glare by controlling the refractive index differences between the air and diffuse reflecting polarizer 16. Alternatively, glare suppressing element 19 may be an optically rough surface that distributes the light reflected from the interface between the air and diffuse reflecting polarizer 16 into a wide variety of angles. The diffusion of the reflected light by glare-suppressing element 19 may be random, ordered, or partially ordered. Optically rough surfaces may include a matte finish, a structured surface, a microstructured surface, an abraded surface, or the like. Furthermore, glare-suppressing element 19 may be a combination of an antireflective material and an optically rough surface.

Projector 12 is capable of projecting polarized light towards projection screen 14 to form a reflected image thereon. For example, projector 12 may project images on to projection screen 14 for presentation to viewers. Projector 12 may be any projector that produces images using polarized light, such as a liquid crystal display (LCD) projector. Light from projector 12 can be polarized in the same direction as the light reflected by screen 14. Thus, projection screen 14 may reflect a substantial portion of the polarized light transmitted by projector 12. A smaller percentage of ambient light, however, may be reflected off screen 14, which may improve image quality in terms of contrast. Projection screen 14 may reflect a substantial portion of an incident wave of polarized light 20 into a variety of directions, as is illustrated by reflected waves 22 and 24. Polarized light from projector 12 may be directly incident on the front side of projection screen 14, as shown in embodiment of FIG. 1.

Figure 2:
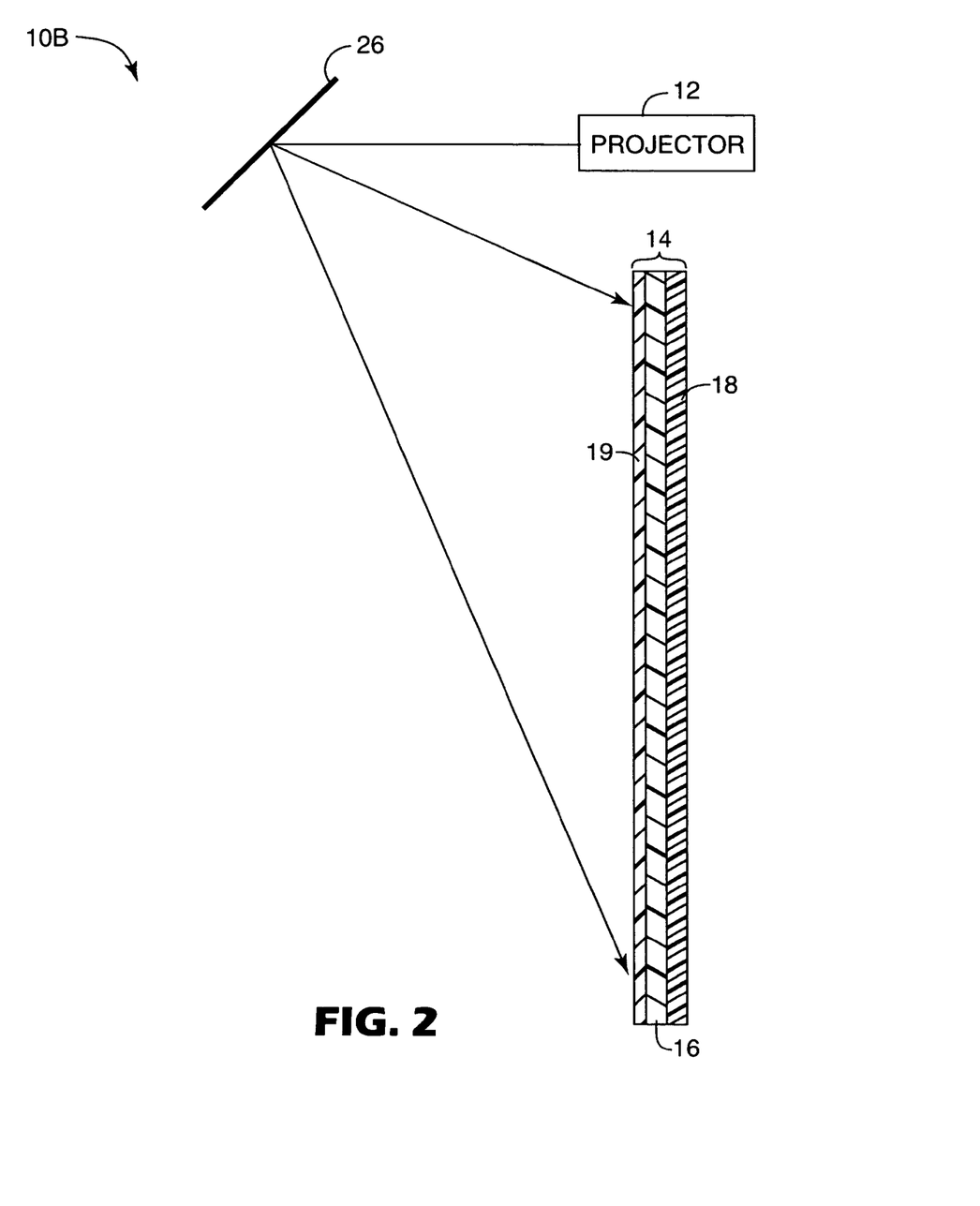
FIG. 2 is another cross-sectional side view illustrating an exemplary projection system in accordance with the principles of the invention.

FIG. 2 illustrates an alternative configuration of system 10B, in which polarized light from projector 12 reflects off one or more mirrors 26 before projecting incident on the front side of projection screen 14. In particular, the use of one or more mirrors 26 to reflect images produce by projector 12 onto projection screen 14 may allow system 10 to assume a more compact arrangement.

Figure 3:
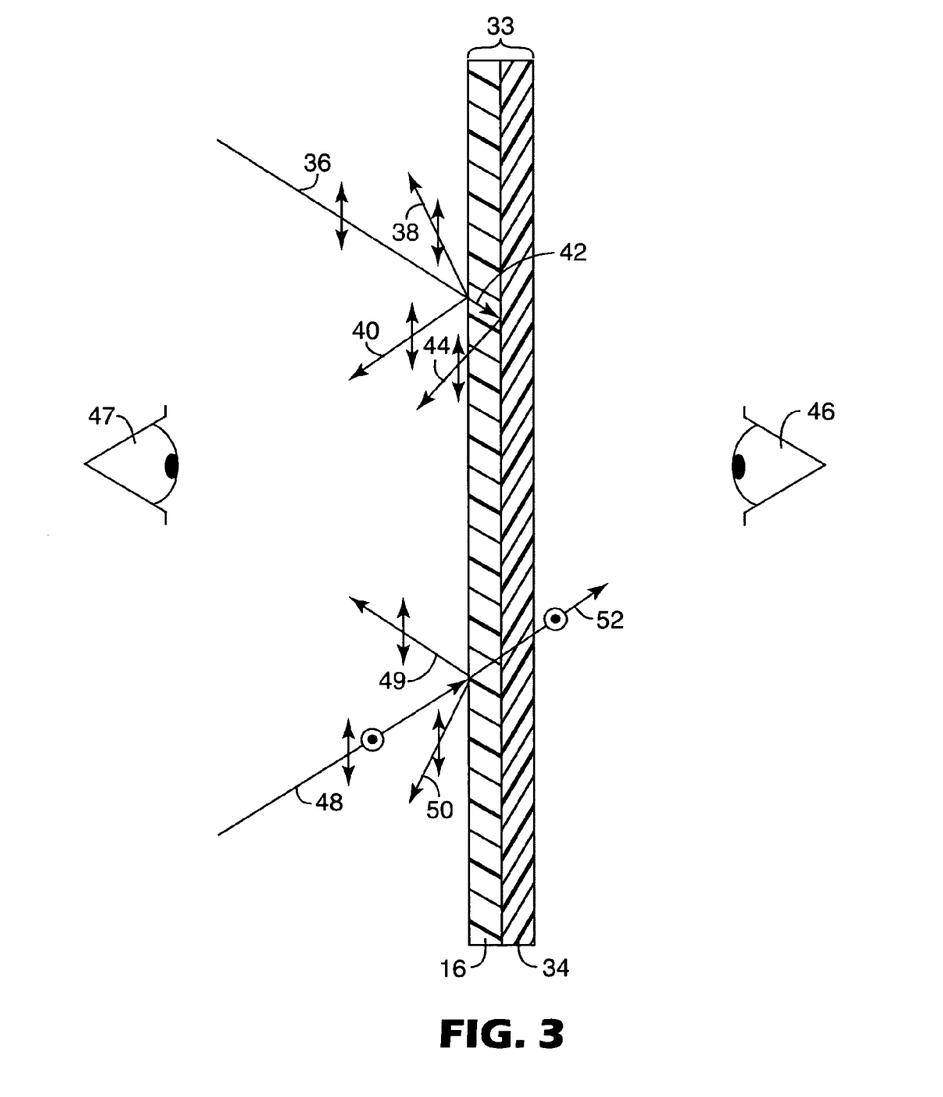
FIG. 3 is a cross-sectional side view illustrating an exemplary embodiment of a projection screen incorporating a diffuse reflecting polarizer adjacent a reflecting polarizer.

FIG. 3 is a cross-sectional side view illustrating an exemplary embodiment of a projection screen 33 that may be used in a system similar to system 10 or system 10B. Projection screen 33 comprises a diffuse reflecting polarizer 16 that diffusely reflects light polarized in a first direction and transmits light polarized in a second polarization. Projection screen 33 also includes a reflecting polarizer 34 adjacent the back side of diffuse reflecting polarizer 16. The orientation of reflecting polarizer 34 with respect to diffuse reflecting polarizer 16 is such that reflecting polarizer 34 reflects light of the first polarization and transmits light of the second polarization. In other words, the transmissive and reflective properties associated with diffuse reflecting polarizer 16 and reflecting polarizer 34 are substantially aligned. Thus, light that is able to pass though diffuse reflecting polarizer 16 can also pass through reflecting polarizer 34.

Diffuse reflecting polarizer 16 reflects a substantial portion of incident polarized light that is polarized in the same direction as the light reflected by diffuse reflecting polarizer 16. A substantial portion of incident polarized light refers to greater than approximately 70 percent, and preferably greater than approximately 80 percent, and still more preferably greater than approximately 90 percent of the incident polarized light. In that case, diffuse reflecting polarizer 16 transmits approximately 10 to 30 percent of the incident polarized light due to inefficiency. For example, diffuse reflecting polarizer 16 may diffusely reflect a substantial proportion of an incident polarized light wave 36, when polarized light wave 36 is polarized in the same direction as the light reflected by diffuse reflecting polarizer 16, as shown by reflected light waves 38 and 40. Diffuse reflecting polarizer 16 may transmit the portion of polarized light wave 36 that is not reflected, illustrated by transmitted light wave 42, when diffuse reflecting polarizer 16 is not a "perfect" diffuse reflecting polarizer. In theory, a perfect diffuse reflecting polarizer may diffusely reflect all incoming light polarized in the same direction as the light reflected by the perfect diffuse reflecting polarizer.

Reflecting polarizer 34 may reflect a substantial portion of transmitted light wave 42 as shown by reflected wave 44. Thus, reflecting polarizer 34 adjacent to the back side of diffuse reflecting polarizer 16 may increase the brightness of the projected image to an observer 47 viewing from the front side of screen 33. Furthermore, reflecting polarizer 34 may help prevent observer 46 from viewing a faint image on the back side of projection screen 33. However, due to inefficiencies, a small portion of polarized light wave 36 may still transmit through both diffuse reflecting polarizer 16 and reflecting polarizer 34.

Ambient light may also be incident on projection screen 33. Ambient light has a generally random polarization. Therefore, diffuse reflecting polarizer 34 may reflect approximately half of the ambient light and transmit the rest.

The amount of ambient light that is reflected may vary, however, depending on the quality and efficiency associated with diffuse reflecting polarizer 34. Ambient light may come from sources such as artificial lighting in a room, the sun, or the like. For example, an ambient light wave 48 may be incident on projection screen 14 and, more particularly, incident on diffuse reflecting polarizer 16. Since ambient light wave 48 is polarized in a random fashion, diffuse reflecting polarizer 16 diffusely reflects approximately half of ambient light wave 48, as illustrated by reflected light waves 49 and 50. Because diffuse reflecting polarizer 16 diffusely reflects approximately half of ambient light wave 48, from the perspective of observer 47, display screen 33 may appear substantially diffuse, i.e. may appear white. As used herein the phrase "substantially diffuse" refers to a display screen that diffusely reflects greater than 20 percent, more preferably greater than 35 percent, and still, even more preferably approximately 50 percent of randomly polarized light.

Diffuse reflecting polarizer 16 transmits the portion of ambient light wave 48 that is not reflected, as shown by transmitted light wave 52. Reflecting polarizer 34 may also transmit transmitted light wave 52. Because diffuse reflecting polarizer 16 transmits approximately half of incident ambient light wave 48 and reflecting polarizer 34 transmits substantially all of transmitted light wave 52, display screen 33, as viewed by observer 46, may be substantially transparent. As used herein the phrase "substantially transparent" refers to a display screen that transmits greater than 20 percent, more preferably greater than 35 percent, and even more preferably approximately 50 percent of randomly polarized light. Furthermore, because display screen 33 transmits approximately half of ambient light wave 48 there may be less ambient light interference to viewer 47, which may increase the contrast of the projected image and improve image quality of images viewed by viewer 47. Display screen 33 illustrated in FIG. 3 may be particularly useful in an environment in which the amount of ambient light is relatively low on the back side of display screen 33 relative to the ambient light on the front side of display screen 33.

One suitable diffuse reflecting polarizer 16 is diffuse reflecting polarizer film (DRPF™ film) commercially available from Minnesota Mining and Manufacturing Company, of St. Paul, Minn. (hereafter 3M). One suitable reflecting polarizer 34 is dual brightness enhancing film (DBEF™ film) commercially available from 3M. These or similar optical films may be used to realize display screen 33.

Figure 4:
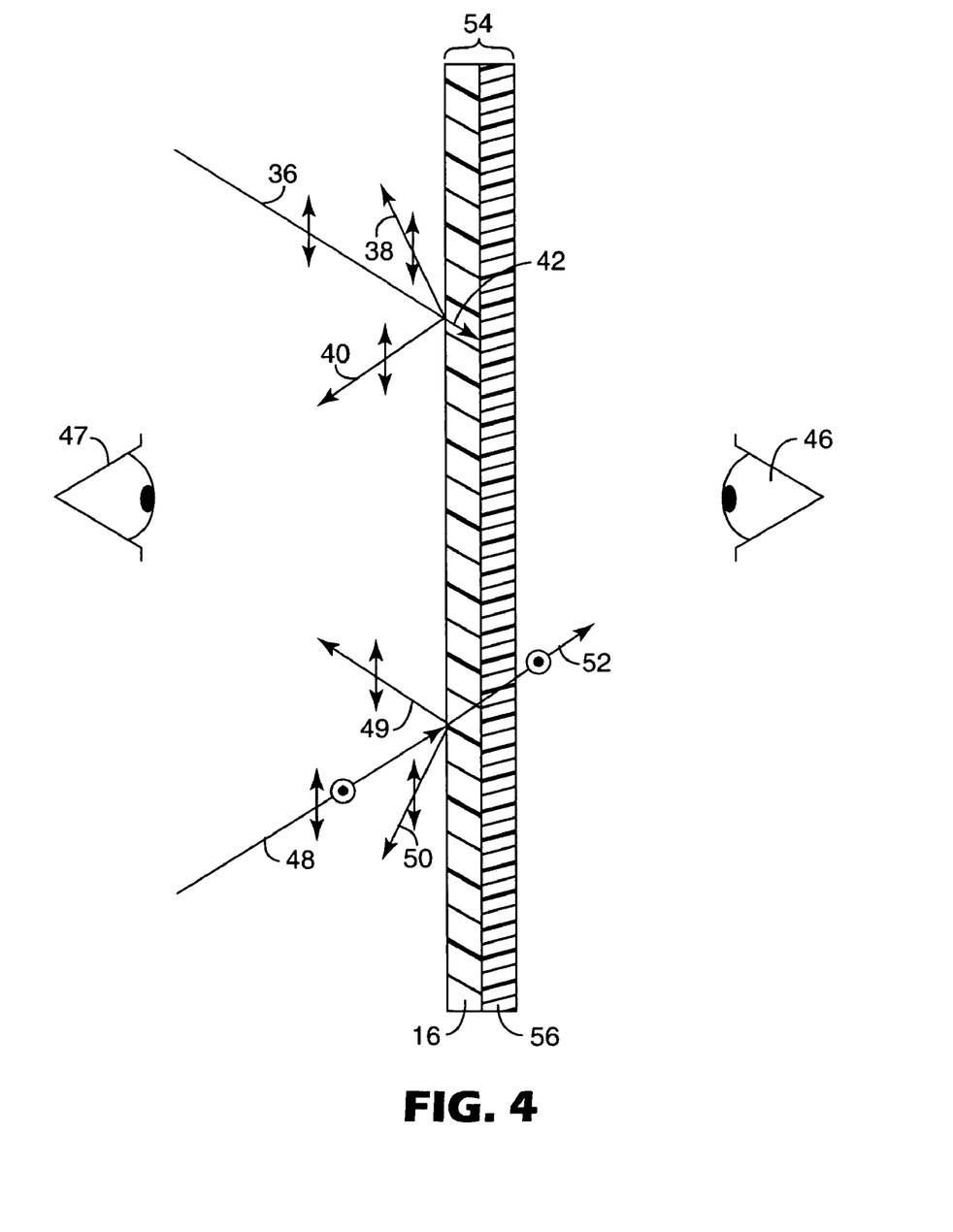
FIG. 4 is cross-sectional side view illustrating an exemplary embodiment of a projection screen incorporating a diffuse reflecting polarizer adjacent an absorbing polarizer.

FIG. 4 is a cross-sectional side view illustrating another exemplary embodiment of a projection screen 54. Projection screen 54 conforms substantially to projection screen 33 illustrated in FIG. 3, but incorporates an absorbing polarizer 56 instead of a reflecting polarizer 34. Like the configuration in FIG. 3, absorbing polarizer 56 and diffuse reflecting polarizer 16 are aligned such that polarized light that is able to transmit through diffuse reflecting polarizer 16 is also able to transmit through absorbing polarizer 56. Absorbing polarizer 56 may absorb a significant portion of transmitted light wave 42, which may pass through diffuse reflecting polarizer 16 because of inefficiency. In addition, absorbing polarizer 56 may prevent an observer 46 from observing a reflection on the back side of projection screen 54.

Projection screen 54 allows approximately half of the randomly polarized light to transmit from the front side of screen 54 to the back side. This is conceptually illustrated by the portions 49 and 50 of incident light 48 being diffusely reflected, and the portion 52 being transmitted. In a similar manner, absorbing polarizer 56 also absorbs or transmits ambient light incident from the back side of projection screen 54. By way of example, absorbing polarizer 56 may absorb approximately half of ambient light incident the back side of screen 54 and may transmit the rest. Therefore, little or no ambient light incident the back side of screen 54 may be reflected. Furthermore, since little or no ambient light reflects toward observer 46, observer 46 may not observe any low contrast images of objects located near the back side of screen 54. In particular, observer 46 may not be able to see a reflection on the back side of screen 54.

Screen 54 may be more suitable for an environment in which the amount of ambient light on the back side of display screen 54 is relatively high in comparison with the amount of ambient light on the front side of display screen 54. For example, screen 54 may be preferred for window displays illuminated during the evening because internal lighting may result in a larger amount of ambient light on the back side of display screen 54. In contrast, screen 33 (FIG. 3) may be preferred for window displays illuminated by a projector during the day, particularly when the window displays are facing the sun.

One suitable absorbing polarizer 56 is product number SG-1852A, commercially available from Sumitomo Chemical Company Ltd. of Japan. Another suitable absorbing polarizer 56 is product number LLC2-8218, commercially available from Sanritz Company of Japan. These or similar optical films may be used to realize display screen 54.

Figure 5:
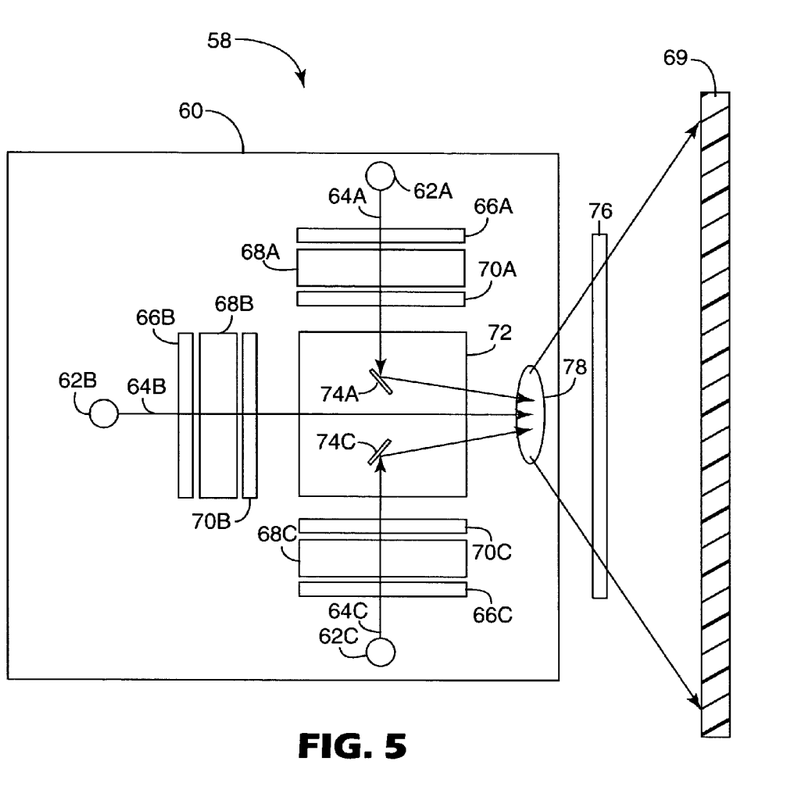
FIG. 5 is cross-sectional top view illustrating an exemplary projection system that includes a multi-color transmissive LCD projector and a projection screen.

FIG. 5 is a cross sectional top view illustrating an exemplary embodiment of a projection system 58 that includes a multi-color transmissive LCD projector 60 that emits light in which all colors are polarized in a common direction. System 58 also includes a projection screen 69 that diffusely reflects light polarized in one direction and transmits light polarized in another direction. By aligning the polarization of light emitted from projector 60 with the diffuse characteristics of screen 69, improved image quality can be achieved. In particular, a higher percentage of light emitted from projector 60 may be diffusely reflected by screen 69, relative to randomly oriented ambient light. Thus, image quality in terms of contrast may be greatly improved, particularly when system 58 is used in settings where large amounts of ambient light is incident the projection surface of screen 69.

Projector 60 is a three-color projector, although the same principles may be extended to hi-fidelity displays that incorporate additional LCDs and additional colors. LCD projector 60 may include light sources 62A to 62C, collectively referred to as light sources 62. Light sources 62, for example, may be a blue light source 62A, a green light source 62B, and a red light source 62C. However, as mentioned, the number of light sources is not limited to three. For example, LCD projector 60 may have fewer than three light sources or more than three light sources.

Light sources 62 emit colored light waves 64A–64C (collectively colored lights 64). Colored lights 64 may pass through a respective one of polarizers 66A to 66C (collectively polarizers 66), which transmit light polarized in a first direction. Liquid crystal displays (LCDs) 68A to 68C (collectively LCDs 68) may selectively transmit colored lights 64 possibly changing the polarization as the light passes through LCDs 68 as is well known in the art. For example, voltages can be selectively applied across any of LCDs 68 to selectively cause LCDs 68 to change the polarization of one or more of colored lights 64. For example, LCD projector 60 may apply an appropriate voltages across LCDs 68 to selectively rotate the polarization of colored lights 64 as the lights pass through LCDs 68.

Colored lights 64 then become incident on a respective one of anlyzers 70A–70C (collectively analyzers 70). Analyzers 70 may be aligned to transmit light polarized in the same direction as light transmitted by polarizer 66, or aligned to transmit light polarized in the opposite direction as light transmitted by polarizer 66. In some cases, analyzer 70 and polarizer 66 may be substantially similar components.

Each of the colored lights 64 that transmit through analyzer 70 enters a color combiner 72. Color combiner 72 may reflect colored lights 64, such as by using mirrors 74A and 74C. However, color combiner 72 may not reflect all colored lights 64 but, instead may project colored light 64B without reflection. Color combiner 72 combines each of colored lights 64 to create full color images. One or more lenses 78 may be used to expand the combined image for display on screen 69.

Light polarized in one direction may be more efficient for reflection whereas light polarized in another direction may be more efficient for transmission. Therefore, to make LCD projector 60 as efficient as possible, it is desirable to cause some of colored light to be polarized in a direction that is more efficient for reflection, and to cause other colored lights to be polarized in a direction that is more efficient for transmission. For example, in the embodiment shown in FIG. 5, colored lights 64A and 64C may be polarized in the direction that is more efficient for reflection, whereas colored light 64B may be polarized in the direction that is more efficient for transmission.

In accordance with one embodiment of the invention, a rotator 76 may be used to rotate the polarization of one or more colored lights 64 emitted from projector 60 in order to align all the polarizations in a common direction. Rotator 76 may be viewed as a part of projector 60, or a separate component to system 58. In any case, it may be highly desirable to have emitted light polarized in a common direction so that all of the colors of the projected light are diffusely reflected off of projection screen 69. To achieve common polarization for all colored light 64, rotator 76 may rotate the polarization of green light 64B, aligning it with the polarizations of blue light 64A and red light 64C. As illustrated in FIG. 5, rotator 76 may be positioned outside of projector 60 to achieve this effect. Alternatively, rotator 76 may be positioned within projector 60, possibly located to rotate the polarization of light before or after it is refracted by lens 78. In any case, by causing the emitted light to be polarized in a single direction, advantages may be realized. For example, the color contrast associated with images displayed on a display screen implementing a diffuse reflective polarizer can be improved.

Rotator 76 may also be used not only to align the polarizations of the various colored light but also, to collectively rotate all of the colored light. For example, rotator 76 may be used to ensure that all of the colored light is properly polarized for display on projection screen 69.

As mentioned, projection screen 69 includes a diffuse reflecting polarizer aligned to diffuse light polarized in the direction corresponding to the common direction of polarized light emitted from projector 60. Again, by aligning the polarization of light emitted from projector 60 with the diffuse characteristics of screen 69, improved image quality can be achieved. For example, approximately 50 percent randomly oriented ambient light may be reflected. However, a much larger percentage of the polarized light emitted from projector 60 can be diffusely reflected. Therefore, image quality in terms of contrast may be greatly improved, particularly when system 58 is used in settings where large amounts of ambient light is incident the projection surface of screen 69. Screen 69 may further include various other components as outlined in greater detail above, including for example, a second polarizer adjacent a back side of the diffuse reflecting polarizer, and a glare suppressing element, if desired.

Figure 6:
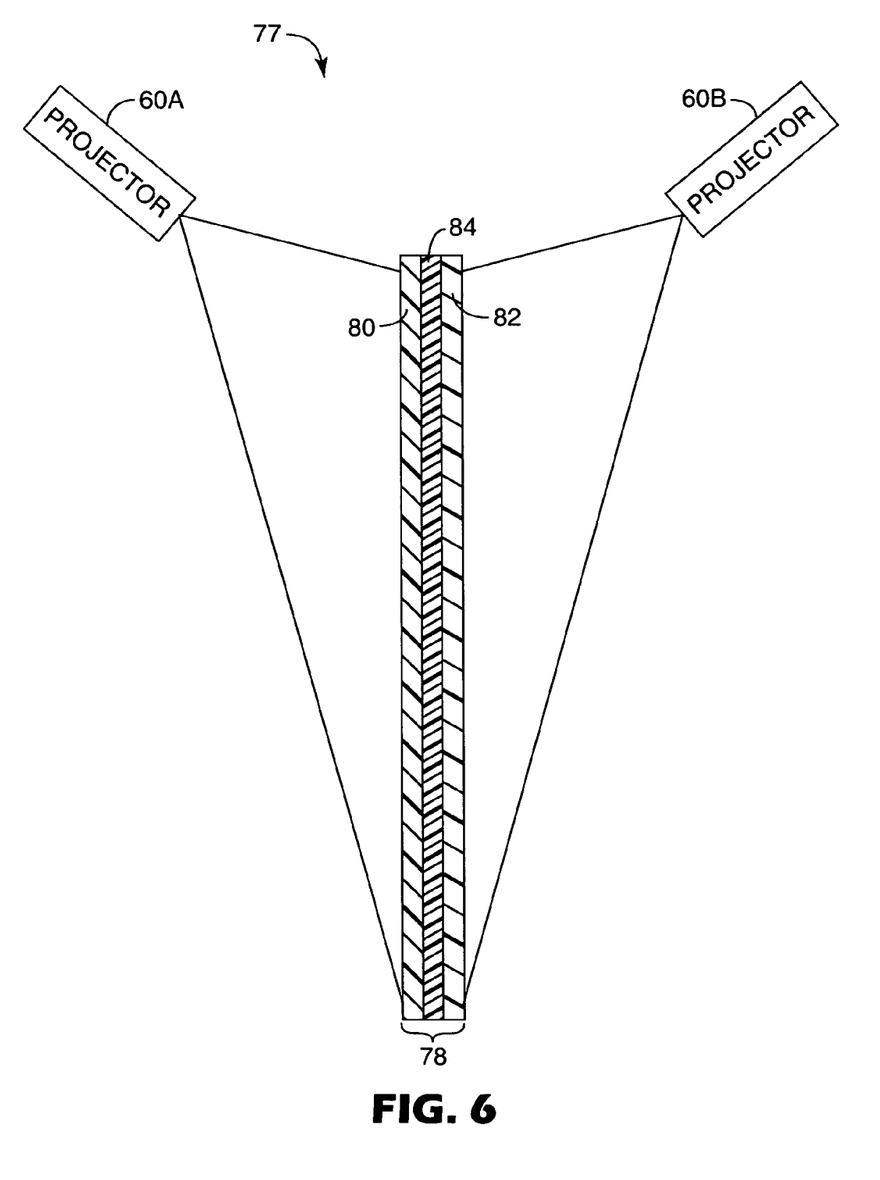
FIG. 6 is a cross-sectional side view illustrating an exemplary projection system having a two-sided projection screen.

FIG. 6 is a cross-sectional side view illustrating an exemplary projection system 77. Projection system 77 includes projectors 60A and 60B (collectively projectors 60), and a projection screen 78. Projection screen 78 comprises a diffuse reflecting polarizer 80 that diffusely reflects light polarized in a first direction and transmits light polarized in a second direction. Projectors 60 may project images onto each side of display screen 78 simultaneously.

Projection screen 78 may also comprise a second diffuse reflecting polarizer 82 oriented to have the same polarization characteristic as diffuse reflecting polarizer 80, i.e. oriented to reflect light polarized in the first direction and transmit light polarized in the second direction. A polarizer 84 may also be placed between diffuse reflecting polarizer 80 and diffuse reflecting polarizer 82. The orientation of polarizer 84 with respect to diffuse reflecting polarizers 80, 82 may be such that polarizer 84 transmits light polarized in the second direction. In other words, diffuse reflecting polarizer 80, diffuse reflecting polarizer 82, and polarizer 84 are aligned such that all three polarizers transmit light polarized in the same direction. Alternatively, polarizer 84 may be oriented to reflect or absorb light that is transmitted through diffuse reflecting polarizers 80 and 82. By way of example, polarizer 84 may be a reflecting polarizer or an absorbing polarizer.

Diffuse reflecting polarizers 80, 82 may transmit a portion of the polarized light from respective projectors 60, due to inefficiencies. Polarizer 84 may reflect or absorb a substantial portion of the transmitted polarized light depending on whether polarizer 84 is a reflecting polarizer or absorbing polarizer, respectively. Further, polarizer 84 may reduce the amount of polarized light that transmits through projection screen 78, reducing the amount of image interference. Improved contrast may be achieved because approximately one-half of ambient light is respectively transmitted through diffuse reflecting polarizers 80, 82. However, if polarizer 84 is aligned with diffuse reflecting polarizers 80, 82, the ambient light that transmits through screen 78 may affect image quality of images displayed on the opposing side.

Projectors 60 may capable of projecting polarized light towards one or both sides of projection screen 78 to form a reflected image thereon. For example, one projector 60A may project images onto one side of projection screen 78 for presentation to viewers. At the same time, the other of projector 60B may project images onto the other side of projection screen 78. For example, projector 60A may project images on a first side of screen 78, while projector 60B simultaneously projects images on the opposite side. Alternatively, one of projectors 60 may project images onto both sides of projection screen 78 for presentation to viewers. For example, projector 60A may be a dual image projector that projects an image on a first side of screen 78 and projects another image on the opposite side of screen 78 using one or more mirrors. In that case, the additional projector 60B may be removed from the system.

A number of embodiments of the present invention have been described. For example, various techniques of manipulating and exploiting light polarization have been described that can improve the display of images to viewers. In addition, the techniques and structures described above may improve projection systems for use in non-conventional settings such as storefront window displays, or settings where large amounts of ambient light is present. Projection screens have also been described that allow viewers viewing the front side of the screen to see improved image quality, while viewers on the back side of the screen are able to see through the screen. These and other embodiments are within the scope of the following claims.

What is claimed is:

1. A projection screen for a projection display system comprising:
 a diffuse reflecting polarizer that diffusively reflects light polarized in a first direction and transmits light polarized in a second direction; and
 a second polarizer adjacent a back side of the diffuse reflecting polarizer, wherein the second polarizer is oriented to transmit light polarized in the second direction.

2. The projection screen of claim 1, wherein the second polarizer includes a reflective polarizer that reflects light polarized in the first direction.

3. The projection screen of claim 1, wherein the second polarizer includes an absorption polarizer that absorbs light polarized in the first direction.

4. The projection screen of claim 1, wherein the second polarizer includes a non-diffuse polarizer.

5. The projection screen of claim 1, wherein the first direction is substantially perpendicular to the second direction.

6. The projection screen of claim 1, wherein the projection screen appears substantially transparent when viewed from a back side of the projection screen corresponding to a light incident side of the second polarizer and appears substantially diffuse when viewed from a front side of the projection screen corresponding to a light incident side of the diffuse reflecting polarizer.

7. The projection screen of claim 6, wherein the projection screen transmits at least 20% of randomly polarized light incident the front side of the projection screen.

8. The projection screen of claim 7, wherein the projection screen transmits at least 35% of randomly polarized light incident the front side of the projection screen.

9. The projection screen of claim 7, wherein the projection screen transmits approximately 50% of randomly polarized light incident the front side of the projection screen.

10. The projection screen of claim 6, wherein the projection screen diffusely reflects greater than approximately 20% of randomly polarized light incident the front side of the projection screen.

11. The projection screen of claim 10, wherein the projection screen diffusely reflects greater than approximately 35% of randomly polarized light incident the front side of the projection screen.

12. The projection screen of claim 10, wherein the projection screen diffusely reflects approximately 50% of randomly polarized light incident the front side of the projection screen.

13. The projection screen of claim 1, wherein the projection screen reflects greater than approximately 70% of light polarized in the first direction incident the diffuse reflecting polarizer.

14. The projection screen of claim 13, wherein the projection screen reflects greater than approximately 80% of light polarized in the first direction incident the diffuse reflecting polarizer.

15. The projection screen of claim 13, wherein the projection screen reflects greater than approximately 90% of light polarized in the first direction incident the diffuse reflecting polarizer.

16. The projection screen of claim 1, further comprising a glare-suppressing element adjacent a front side of the diffuse reflecting polarizer to suppress glare.

17. A projection screen for a projection display system comprising:
 a diffuse reflecting polarizer that diffusively reflects light polarized in a first direction and transmits light polarized in a second direction; and
 a reflecting polarizer adjacent a back side of the diffuse reflecting polarizer, wherein the reflective polarizer is oriented to reflect light polarized in the first direction and transmit light polarized in the second direction such that the projection screen appears substantially transparent when viewed from a back side of the projection screen corresponding to a light incident side of the reflecting polarizer and appears substantially diffuse when viewed from a front side of the projection screen corresponding to a light incident side of the diffuse reflecting polarizer.

18. A projection screen for a projection display system comprising:
 a diffuse reflecting polarizer that diffusively reflects light polarized in a first direction and transmits light polarized in a second direction; and
 an absorbing polarizer adjacent a back side of the diffuse reflecting polarizer, wherein the absorbing polarizer is oriented to absorb light polarized in the first direction and transmit light polarized in the second direction such that the projection screen appears substantially transparent when viewed from a back side of the projection screen corresponding to a light incident side of the absorbing polarizer and appears substantially diffuse when viewed from a front side of the projection screen corresponding to a light incident side of the diffuse reflecting polarizer.

* * * * *